US012774733B2

(12) United States Patent
Park

(10) Patent No.: US 12,774,733 B2
(45) Date of Patent: Oct. 27, 2026

(54) RETAINER FOR SHOCK ABSORBER

(71) Applicant: HL MANDO CORPORATION, Pyeongtaek (KR)

(72) Inventor: Hyunsoo Park, Seongnam (KR)

(73) Assignee: HL MANDO CORPORATION, Pyeongtaek (KR)

( * ) Notice: Subject to any disclaimer, the term of this patent is extended or adjusted under 35 U.S.C. 154(b) by 542 days.

(21) Appl. No.: 18/318,770

(22) Filed: May 17, 2023

(65) Prior Publication Data

US 2024/0309931 A1 Sep. 19, 2024

(30) Foreign Application Priority Data

Mar. 15, 2023 (KR) ........................ 10-2023-0034214

(51) Int. Cl.
*F16F 9/34* (2006.01)
*F16F 9/32* (2006.01)
*F16F 9/348* (2006.01)

(52) U.S. Cl.
CPC .......... *F16F 9/3484* (2013.01); *F16F 9/3481* (2013.01); *F16F 2222/12* (2013.01); *F16F 2230/36* (2013.01)

(58) Field of Classification Search
CPC ...... F16F 9/5126; F16F 9/3484; F16F 9/3485; F16F 9/3482; F16F 9/3481; F16F 9/466; F16F 1/027; F16F 2222/12; F16F 9/3214; F16F 2230/36; F16F 9/348
See application file for complete search history.

(56) References Cited

U.S. PATENT DOCUMENTS

| | | | | | |
|---|---|---|---|---|---|
| 3,043,404 | A * | 7/1962 | Peras | F16K 15/1402 | 137/493 |
| 5,180,039 | A * | 1/1993 | Axthammer | F16F 9/46 | 188/315 |
| 7,395,907 | B2 * | 7/2008 | de Kock | F16F 9/512 | 188/316 |
| 7,562,750 | B2 * | 7/2009 | Lemmens | F16F 9/34 | 188/266.6 |
| 8,083,039 | B2 * | 12/2011 | Vanbrabant | F16F 9/3488 | 188/322.15 |
| 9,212,719 | B2 * | 12/2015 | Kim | F16F 9/5126 | |
| 9,347,512 | B2 * | 5/2016 | Yamada | F16F 9/3484 | |

(Continued)

FOREIGN PATENT DOCUMENTS

KR 10-2014-0114050 A 9/2014

OTHER PUBLICATIONS

Office Action From Ministry of Intellectual Property Office of Korea Dated May 14, 2016 Issued for Corresponding Korean Patent Application.

*Primary Examiner* — Robert A. Siconolfi
*Assistant Examiner* — James K Hsiao
(74) *Attorney, Agent, or Firm* — Harvest IP Law, LLP

(57) ABSTRACT

A retainer for a shock absorber is provided. The retainer includes a central hole, a protrusion portion, at least one through hole formed outside a radius of the protrusion portion, and a seat portion protruding outside a radius of the through hole, in which at least two points on the seat portion are spaced apart from each other by different distances from a central axis vertically penetrating the central hole, the seat portion forms a rotationally symmetrical shape with respect to the central axis, and the seat portion forms an outer periphery.

9 Claims, 6 Drawing Sheets

(56) References Cited

U.S. PATENT DOCUMENTS

| | | | | |
|---|---|---|---|---|
| 9,682,605 | B2* | 6/2017 | Ankney | F16F 9/516 |
| 11,808,323 | B2* | 11/2023 | Montagna | F16F 9/185 |
| 2008/0006493 | A1* | 1/2008 | Jee | F16F 9/465 188/282.5 |
| 2009/0294232 | A1* | 12/2009 | Ashiba | F16F 9/348 188/322.15 |
| 2010/0163355 | A1* | 7/2010 | Yamaguchi | F16F 9/585 188/280 |
| 2011/0209957 | A1* | 9/2011 | Ashiba | F16F 9/348 188/322.15 |
| 2013/0168195 | A1* | 7/2013 | Park | F16F 9/3214 188/322.22 |
| 2013/0180813 | A1* | 7/2013 | Moore, Jr. | F16F 9/348 188/282.6 |
| 2015/0008083 | A1* | 1/2015 | Yamada | F16F 9/348 188/322.15 |
| 2015/0034437 | A1* | 2/2015 | Yamada | F16F 9/3481 188/322.15 |
| 2016/0243917 | A1* | 8/2016 | Ankney | F16F 9/516 |
| 2016/0356335 | A1* | 12/2016 | Nomura | F16F 9/3485 |
| 2017/0335919 | A1* | 11/2017 | Holtmann | F16F 9/348 |
| 2019/0368569 | A1* | 12/2019 | Yamashita | F16F 9/348 |
| 2020/0208707 | A1* | 7/2020 | Nakano | F16F 9/3484 |

* cited by examiner

RETAINER FOR SHOCK ABSORBER

TECHNICAL FIELD

The present disclosure relates to a retainer for a shock absorber, and more particularly, to a retainer for a shock absorber including a protrusion portion and a seat portion defining an initial pressing region of a disc.

BACKGROUND

The contents described in this part simply provide background information on the present disclosure and do not constitute prior art.

A shock absorber supports the weight of a vehicle body and dampens vibrations transmitted from a road surface to the vehicle body to improve ride comfort and protect a vehicle and a loaded cargo.

The shock absorber includes a cylinder filled with a working fluid (oil), a piston rod connected to the vehicle body and reciprocating, and a piston valve coupled to a lower end of the piston rod to slide in the cylinder and controlling a flow of the working fluid.

Meanwhile, a shock absorber having a structure in which compression and tension retainers are disposed on upper and lower portions of a piston body has been proposed, and the retainers provided in the shock absorber will be described with reference to FIGS. 1 and 2.

Referring to FIGS. 1 and 2, a central hole 4 penetrates through a central portion of the retainer, a connection hole 5 communicating with a compression channel (not illustrated) is penetrated outside the radius of the central hole 4, and a piston rod (not illustrated) is inserted into the central hole 4.

A retainer 1 includes a protrusion portion 2 protruding in a reciprocating direction of the piston rod along the outer periphery of the central hole 4, and an inner edge of a disc 6 is seated on the protrusion portion 2. A seat portion 3 protrudes concentrically with the protrusion portion 2 outside the radius of the protrusion portion 2, and an outer edge of the disc 6 is seated on the seat portion 3.

The seat portion 3 of the above conventional retainer is formed in a circular shape, and thus, when the fluid flows into the disc 6 side through the connection hole 5, all parts of the disc 6 are simultaneously spaced apart from the retainer 1. Accordingly, there is a problem in that the working fluid is rapidly introduced and the riding comfort is deteriorated.

SUMMARY

Therefore, the present disclosure has been made to solve the above-mentioned problems, and an object thereof is to provide a retainer for a shock absorber that prevents a sudden flow of fluid by including a seat portion having at least two points spaced apart from a central axis by different distances from each other.

The problems to be solved by the present disclosure are not limited to the problems mentioned above, and other problems not mentioned will be clearly understood by those skilled in the art from the description below.

According to a first embodiment of the present disclosure, there is provided a retainer for a shock absorber including: a central hole formed in a central portion through which the piston rod passes; a protrusion portion protruding in a longitudinal direction of the piston rod along an outer periphery of the central hole; at least one through hole configured to communicate with a channel formed in the piston head and formed outside a radius of the protrusion portion; and a seat portion protruding in the longitudinal direction outside a radius of the through hole to seat a disc, in which at least two points on the seat portion are spaced apart from each other by different distances from a central axis vertically penetrating the central hole, the seat portion forms a rotationally symmetrical shape with respect to the central axis, and the seat portion forms an outer periphery.

The seat portion may include a first diameter portion having at least one circular arc protruding at a position spaced apart by a first radius from the central axis, and a second diameter portion having at least one circular arc protruding at a position spaced apart by a second radius from the central axis.

The seat portion may further include a connecting portion that connects the first diameter portion and the second diameter portion to form a closed curve and has a shape without any angular corners in all sections.

Each through hole may be formed at a position away from the central axis by a third radius, and the third radius may be larger than the first radius and smaller than the second radius.

A plurality of through holes may be formed, and the plurality of through holes may be equiangularly arranged.

Two through holes may be formed inside each radius of the circular arc of the second diameter portion, and the retainer for a shock absorber may further include a partition wall which protrudes radially inward from the second diameter portion and in which at least a portion is disposed between the two through holes.

An area of each through hole may be equal to or larger than a predetermined size.

The protrusion portion and the seat portion may protrude by the same height in the longitudinal direction of the piston rod.

According to a second embodiment of the present disclosure, there is provided a retainer for a shock absorber including: a central hole formed in a central portion through which the piston rod passes; a protrusion portion protruding in a longitudinal direction of the piston rod along an outer periphery of the central hole; at least one through hole configured to communicate with a channel formed in the piston head and formed outside a radius of the protrusion portion; and a seat portion protruding in the longitudinal direction outside a radius of the through hole to seat a disc, in which at least two points on the seat portion are spaced apart from each other by different distances from a central axis vertically penetrating the central hole, the seat portion forms a rotationally asymmetrical shape with respect to the central axis, and the seat portion forms an outer periphery.

The seat portion may include a first diameter portion having at least one circular arc protruding at a position spaced apart by a first radius from the central axis, and a second diameter portion having at least one circular arc protruding at a position spaced apart by a second radius from the central axis.

The seat portion may further include a connecting portion that connects the first diameter portion and the second diameter portion to form a closed curve and has a shape without any angular corners in all sections.

Each through hole may be formed at a position away from the central axis by a third radius, and the third radius may be larger than the first radius and smaller than the second radius.

Two through holes may be formed inside each radius of the circular arc of the second diameter portion, and the retainer for a shock absorber may further include a partition wall which protrudes radially inward from the second diameter portion and in which at least a portion is disposed between the two through holes.

An area of each through hole may be equal to or larger than a predetermined size.

The protrusion portion and the seat portion may protrude by the same height in the longitudinal direction of the piston rod.

The retainer for a shock absorber according to the present disclosure includes the seat portion having at least two points spaced apart from a central axis by different distances from each other, and thus, it is possible to prevent a sudden flow of the fluid.

DETAILED DESCRIPTION

Figure 1:
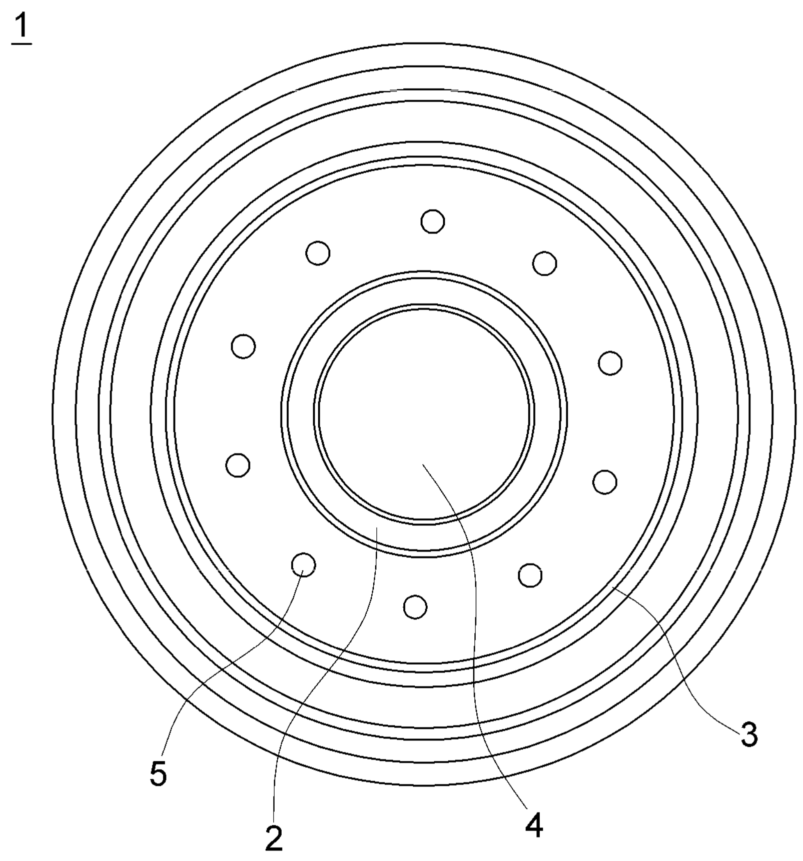
FIG. 1 is a plan view for explaining a structure of a conventional retainer.
Figure 2:
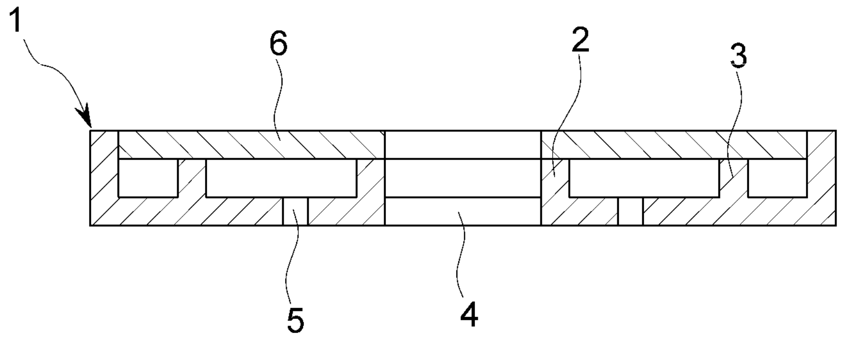
FIG. 2 is a cross-sectional view for explaining the structure of the conventional retainer.

Advantages and features of the present disclosure, and methods of achieving them, will become clear with reference to the detailed description of the following embodiments taken in conjunction with the accompanying drawings. However, the present disclosure is not limited to the embodiments disclosed below, but will be implemented in various different forms, these embodiments are provided to make the disclosure of the present disclosure complete, and merely provided to completely inform those skilled in the art to which the present disclosure belongs of the scope of the invention, and the present disclosure is only defined by the scope of the claims. Thus, in some embodiments, well-known process steps, well-known device structures, and well-known techniques have not been described in detail in order to avoid obscuring the interpretation of the present disclosure. Like reference numbers designate like elements throughout the specification.

In the drawings, the thickness is illustrated enlarged to clearly express the various layers and regions. Like reference numerals have been assigned to like parts throughout the specification. When a part such as a layer, film, region, plate, or the like is said to be "on" another part, this includes not only the case where it is "directly on" the other part, but also the case where there is another part therebetween. Conversely, when a part is said to be "directly on" another part, it means that there is no other part therebetween. In addition, when a part such as a layer, film, region, plate, or the like is said to be "below" another part, this includes not only the case where it is "directly below" the other part, but also the case where there is another part therebetween. Conversely, when a part is said to be "directly below" another part, it means that there is no other part therebetween.

The spatially relative terms such as "below", "beneath", "lower", "above", "upper", or the like may be used to readily describe the relationship between one element or element and another element or element as illustrated in the drawings. The spatially relative terms should be understood as encompassing different orientations of elements in use or operation in addition to the orientations illustrated in the drawings. For example, when elements illustrated in the drawings are reversed, elements described as "below" or "beneath" other elements may be placed "above" the other elements. Thus, the exemplary term "below" may include directions of both below and above. Elements may also be oriented in other orientations, and thus, the spatially relative terms may be interpreted according to orientation.

In this specification, when a part is said to be connected to another part, this includes not only the case where it is directly connected, but also the case where it is connected with another element interposed therebetween. In addition, when a part includes a certain component, it means that it may further include other components without excluding other components unless otherwise specified.

In this specification, terms such as first, second, and third may be used to describe various components, but these components are not limited by the terms. The terms are used for the purpose of distinguishing one component from other components. For example, a first component could be termed a second or third component, or the like, and similarly, a second or third component could also be termed interchangeably, without departing from the scope of the present disclosure.

Unless otherwise defined, all terms (including technical and scientific terms) used in the present specification may be used in a meaning commonly understood by those of ordinary skill in the art to which the present disclosure belongs. In addition, terms defined in commonly used dictionaries are not interpreted ideally or excessively unless explicitly specifically defined.

Hereinafter, a retainer for a shock absorber according to a first embodiment of the present disclosure will be described with reference to FIGS. 3 and 4.

Figure 3:
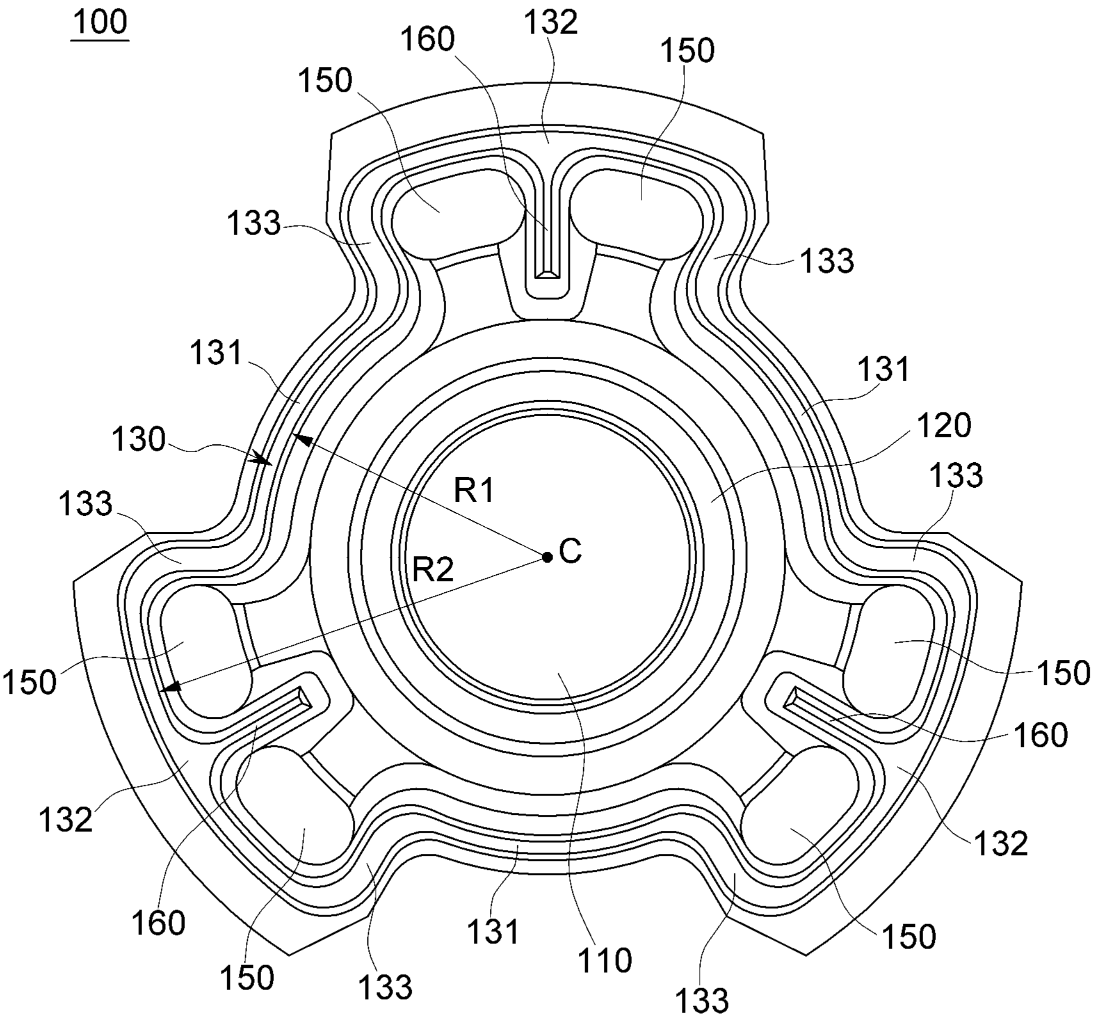
FIG. 3 is a view illustrating a retainer for a shock absorber according to a first embodiment of the present disclosure.

FIG. 3 is a view illustrating the retainer for a shock absorber according to the first embodiment of the present disclosure.

Figure 4:
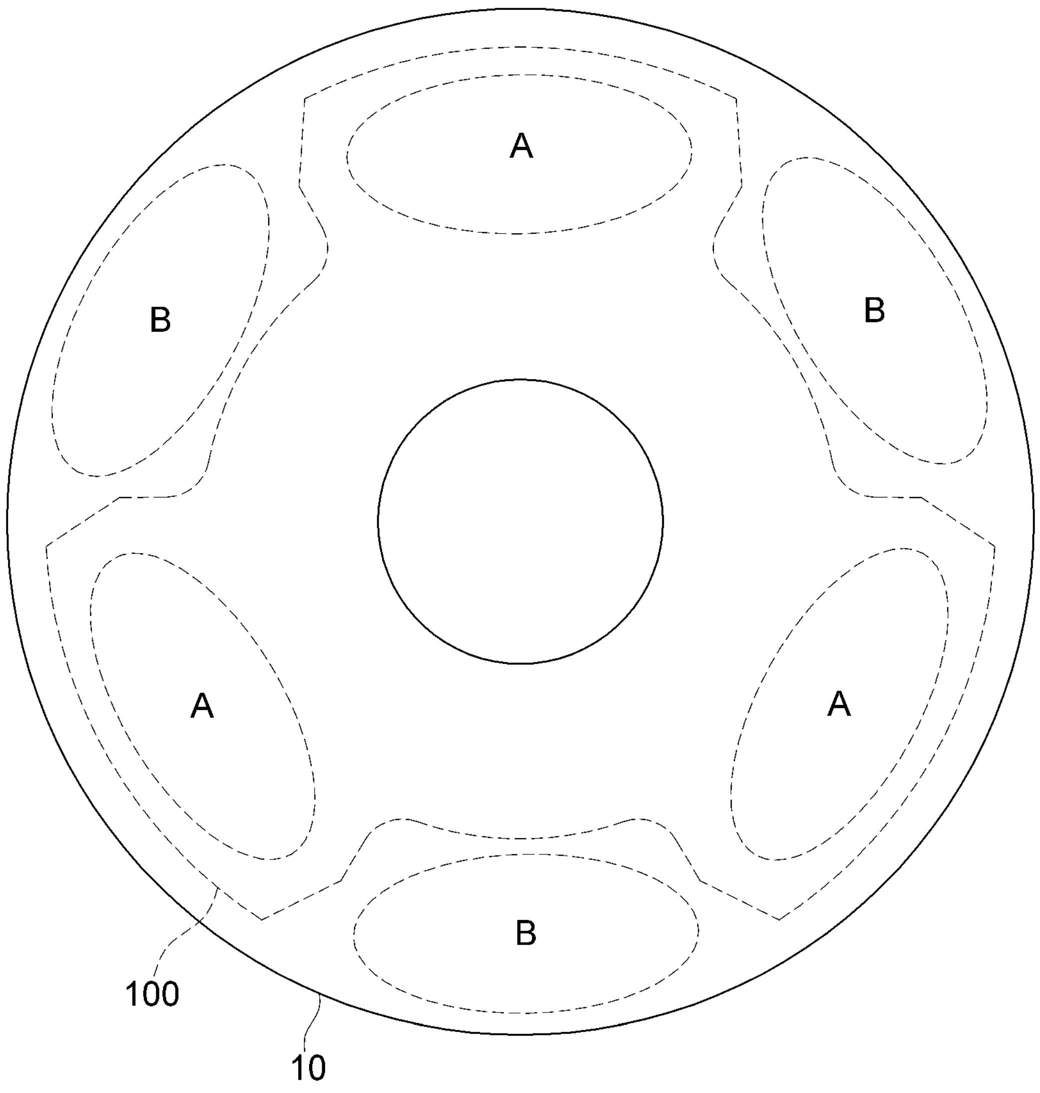
FIG. 4 is a view illustrating a state in which an annular disc is seated on the retainer for a shock absorber according to the first embodiment of the present disclosure.

FIG. 4 is a view illustrating a state in which an annular disc is seated on the retainer for a shock absorber according to the first embodiment of the present disclosure.

Referring to FIGS. 3 and 4, a central hole 110 is formed in a central portion of a retainer 100 for a shock absorber, and a piston rod penetrates the central hole 110 to perform sliding movement.

A piston head is disposed on the upper or lower side of the retainer 100 for a shock absorber, the piston rod penetrates the central portion of the piston head, and a compression channel and a tension channel penetrate around the piston rod.

At least one through hole 150 communicating with the channel formed in the piston head is formed outside the radius of the central hole 110 of the retainer 100 for a shock absorber. Specifically, the through hole 150 of the retainer 100 for a shock absorber according to the first embodiment of the present disclosure communicates with the compression channel formed in the piston head. The retainer 100 for a shock absorber is disposed on the upper side of the piston head, and the annular disc 10 may be seated on the upper side of the retainer 100 for a shock absorber. When a working fluid moves upward from the compression channel, the working fluid may sequentially pass through the compression channel and the through hole 150 to press the bottom surface of the annular disc 10 upward. The annular disc 10 may be displaced upward by the hydraulic pressure of the working fluid.

However, the present disclosure is not limited to the case where the retainer 100 for a shock absorber of the present disclosure is disposed above the piston head and the through hole 150 communicates with the compression channel. For example, the retainer for a shock absorber of the present disclosure may be disposed below the piston head and the through hole may be formed to communicate with the tension channel.

The retainer 100 for a shock absorber includes a protrusion portion 120 protruding in a longitudinal direction (hereinafter referred to as "longitudinal direction") of the piston rod along the outer periphery of the central hole 110, and a seat portion 130 protruding in the longitudinal direction outside the radius of the through hole 150 so that the annular disc 10 is seated. Preferably, the protrusion portion 120 and the seat portion 130 may protrude by the same height in the longitudinal direction. The protrusion portion 120 and the seat portion 130 protrude upward, and the annular disc 10 may be seated on the upper side of the seat portion 130 of the protrusion portion 120. Here, an inner edge of the annular disc 10 may be seated on the protrusion portion 120, and an outer edge of the annular disc 10 may be seated on the seat portion 130. The seat portion 130 has a numerical specification that is completely covered by the disc 10. That is, all areas of the seat portion 130 are placed inside the radius of the outer edge of the disc 10.

Since the through hole 150 is formed between the protrusion portion 120 and the seat portion 130 in the radial direction, the working fluid introduced to the upper surface of the retainer 100 for a shock absorber through the through hole 150 presses the annular disc 10 upward in the region partitioned by the protrusion portion 120 and the seat portion 130. When the working fluid continues to flow into the upper part of the through hole 150, eventually the annular disc 10 is completely separated upward from the retainer 100 for a shock absorber, and the fluid can press all areas of the lower surface of the annular disc 10. However, the pressing region (hereinafter referred to as "pressing region") when the working fluid starts to press the disc 10 depends on the shape of the seat portion 130.

At least two points on the seat portion 130 according to the first embodiment of the present disclosure are spaced apart from each other by different distances from a central axis (C; hereinafter referred to as "central axis") vertically penetrating the central hole 110. Here, the fact that at least two points on the seat portion 130 are spaced apart from the central axis C by different distances means that the seat portion 130 does not protrude along a circular path.

Since the pressing region is not circular, each part of the annular disc 10 is opened with a time difference. Here, that a certain part of the disc 10 is opened means that the part is separated from the retainer 100 for a shock absorber. For example, referring to FIG. 4, the hydraulic pressure acts first on a region A of the disc 10 placed radially inside the seat portion 130, and the hydraulic pressure acts later on a region B of the disc 10 placed radially outside the seat portion 130. Accordingly, since the working fluid does not flow rapidly, the vibration of the vehicle is effectively damped.

In addition, the seat portion 130 according to the first embodiment of the present disclosure forms a rotationally symmetrical shape with respect to the central axis C. That is, the seat portion 130 is formed to overlap when rotated at a certain angle with respect to the central axis C. Due to this shape, load is prevented from being intensively applied to some regions of the retainer 100 for a shock absorber and the disc 10, and accordingly, it is possible to prevent intensive wear of some regions of the retainer for a shock absorber 100 and the disc 10.

In addition, the seat portion 130 according to the first embodiment of the present disclosure forms an outer periphery of the retainer 100 for a shock absorber. That is, the outer periphery of the retainer 100 for a shock absorber is defined by the seat portion 130. As a result, there is no need to allocate unnecessary materials to the outside of the seat portion 130, and thus, the manufacturing cost of the retainer 100 for a shock absorber can be reduced.

The seat portion 130 may include a first diameter portion 131 having at least one circular arc protruding from a position spaced apart from the central axis C by a first radius R1, and a second diameter portion 132 having at least one circular arc protruding from a position spaced apart from the central axis C by a second radius R2. Furthermore, the seat portion 130 may further include a connecting portion 133 that connects the first diameter portion 131 and the second diameter portion 132 to each other to form a closed curve and has a smooth shape in all sections. Here, having a smooth shape in all sections means having a shape without angular corners in all sections. Due to this shape, the fluid can flow more smoothly without forming a vortex.

Specifically, each of the first diameter portion 131 and the second diameter portion 132 may include three circular arcs equiangularly disposed at intervals of 120 degrees. The circular arc of the first diameter portion 131 and the circular arc of the second diameter portion 132 may alternately protrude along the circumferential direction, and between the circular arcs 131 and 132, the connecting portion 133 that smoothly connects the first diameter portion 131 and the second diameter portion 132 may protrude.

The through hole 150 may be formed at a location away from the central axis C by a third radius larger than the first radius R1 and smaller than the second radius R2. That is, the through hole 150 is formed between the first diameter portion 131 and the second diameter portion 132 in the radial direction. Two through holes 150 may be formed inside each radius of the circular arc of the second diameter portion 132.

In addition, the retainer 100 for a shock absorber may further include a partition wall 160 which protrudes radially inward from the second diameter portion 132 and in which at least a portion disposed between the two through holes 150. The partition wall 160 may protrude from the second diameter portion 132 to a position spaced apart from the rotation axis by the first radius R1.

However, the retainer 100 for a shock absorber of the present disclosure is not limited to this embodiment. For example, the retainer for a shock absorber of the present disclosure may have a plurality of through holes arranged at an equal angle.

The area of each through hole 150 may be greater than or equal to a predetermined size. Here, the area of the through hole 150 may be determined in consideration of the difficulty of the manufacturing process of the retainer 100 for a shock absorber, for example, the casting process. The retainer 100 for a shock absorber of the present disclosure can be produced, for example, only through a casting process, but when the through hole 150 is too small, since a process of drilling the through hole 150 should be additionally performed after the casting process, the area of the through hole 150 is determined in consideration of the difficulty of the manufacturing process.

Hereinafter, a retainer 200 for a shock absorber according to a second embodiment of the present disclosure will be described with reference to FIGS. 5 and 6.

Figure 5:
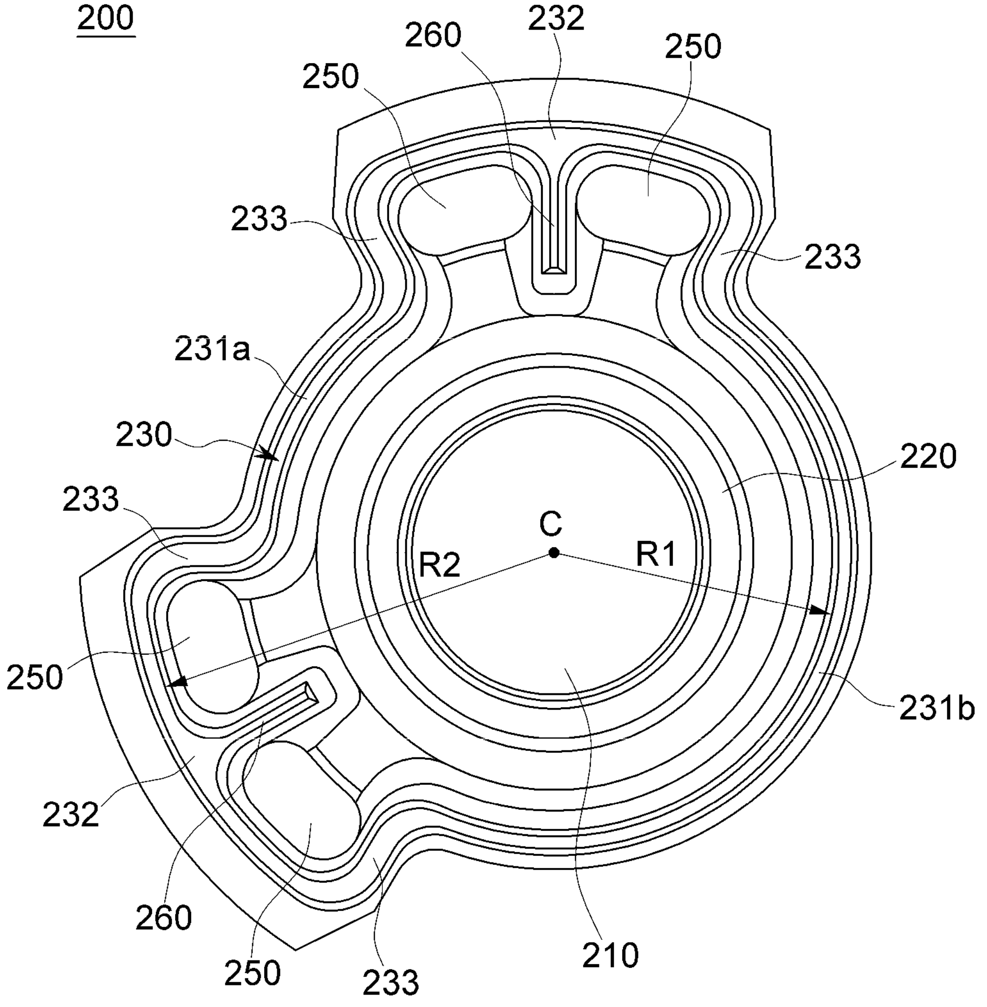
FIG. 5 is a view illustrating a retainer for a shock absorber according to a second embodiment of the present disclosure.

FIG. 5 is a view illustrating a retainer for a shock absorber according to a second embodiment of the present disclosure.

Figure 6:
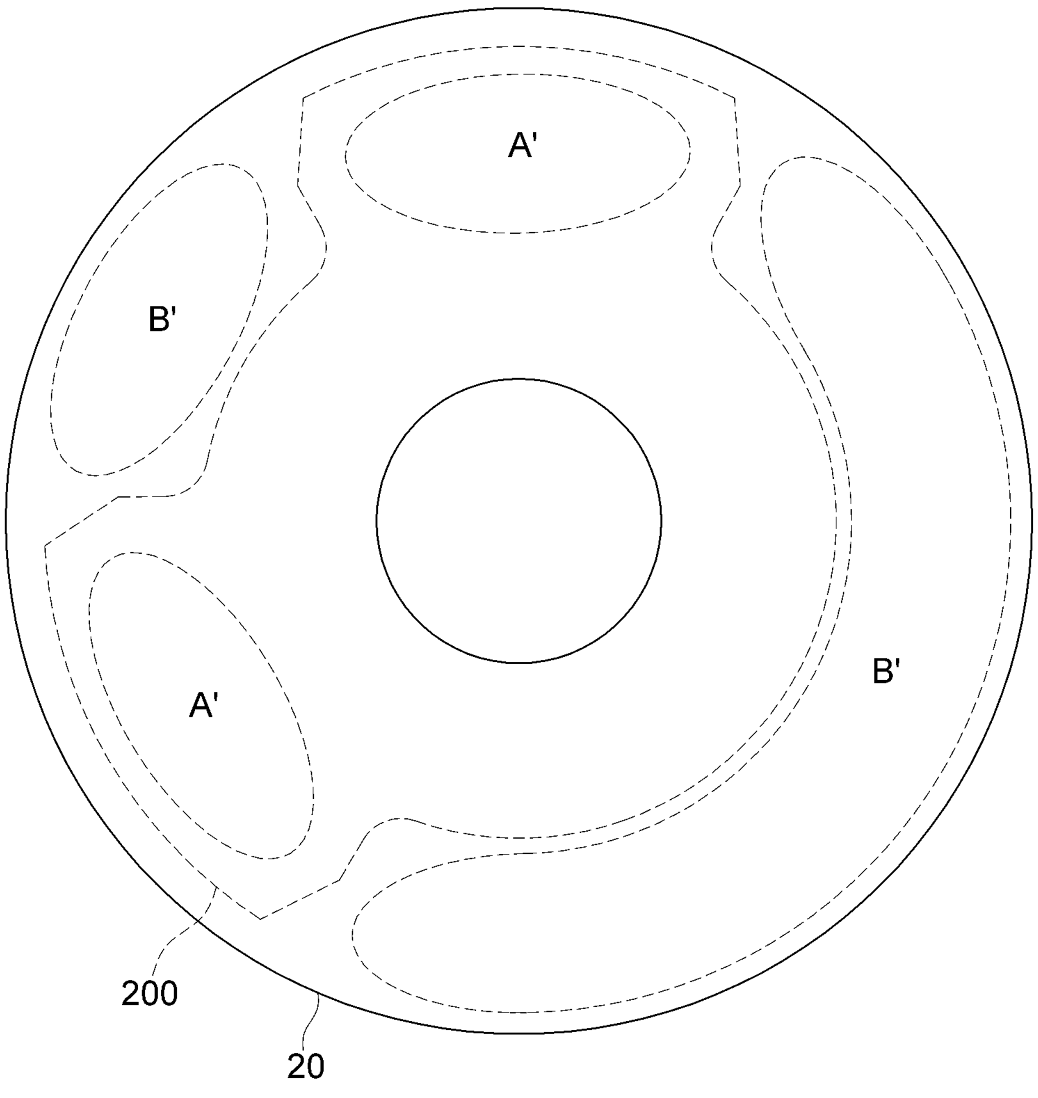
FIG. 6 is a view illustrating a state in which an annular disc is seated on the retainer for a shock absorber according to the second embodiment of the present disclosure.

FIG. 6 is a view illustrating a state in which an annular disc is seated on the retainer for a shock absorber according to the second embodiment of the present disclosure.

Referring to FIGS. 5 and 6, a central hole 210 is formed in a central portion of a retainer 200 for a shock absorber, and a piston rod penetrates the central hole 210 to perform a sliding motion.

A piston head is disposed on the upper or lower side of the retainer 200 for a shock absorber. The piston rod is penetrated through the central portion of the piston head, and a compression channel and a tension channel are penetrated around the piston rod.

At least one through hole 250 communicating with the channel formed in the piston head is formed outside the radius of the central hole 210 of the retainer 200 for a shock absorber. Specifically, the through hole 250 of the retainer 200 for a shock absorber according to the second embodiment of the present disclosure communicates with the compression channel formed in the piston head. The retainer 200 for a shock absorber is disposed on the upper side of the piston head, and the annular disc 20 may be seated on the upper side of the retainer 200 for a shock absorber. When the working fluid moves upward from the compression channel, the working fluid may sequentially pass through the compression channel and the through hole 250 to press the bottom surface of the annular disc 20 upward. The annular disc 20 may be displaced upward by the hydraulic pressure of the working fluid.

However, the present disclosure is not limited to the case where the retainer 200 for a shock absorber of the present disclosure is disposed above the piston head and the through hole 250 communicates with the compression channel. For example, the retainer for a shock absorber of the present disclosure may be disposed below the piston head and the through hole may be formed to communicate with the tension channel.

The retainer 200 for a shock absorber includes a protrusion portion 220 protruding in the longitudinal direction (hereinafter referred to as "longitudinal direction") of the piston rod along the outer periphery of the central hole 210, and a seat portion 230 protruding in the longitudinal direction outside the radius of the through hole 250 so that the annular disc 20 is seated. Preferably, the protrusion portion 220 and the seat portion 230 may protrude by the same height in the longitudinal direction. The protrusion portion 220 and the seat portion 230 protrude upward, and the annular disc 20 may be seated on the upper side of the seat portion 230 of the protrusion portion 220. Here, an inner edge of the annular disc 20 may be seated on the protrusion portion 220, and an outer edge of the annular disc 20 may be seated on the seat portion 230. The seat portion 230 has a numerical specification that is completely covered by the disc 20. That is, all areas of the seat portion 230 are placed inside the radius of the outer edge of the disc 20.

Since the through hole 250 is formed between the protrusion portion 220 and the seat portion 230 in the radial direction, the working fluid introduced to the upper surface of the retainer 200 for a shock absorber through the through hole 250 presses the annular disc 10 upward in the region partitioned by the protrusion portion 220 and the seat portion 230. When the working fluid continues to flow into the upper part of the through hole 250, eventually the annular disc 20 is completely separated upward from the retainer 200 for a shock absorber, and the fluid can press all areas of the lower surface of the annular disc 20. However, the pressing region (hereinafter referred to as "pressing region") when the working fluid starts to press the disc 20 depends on the shape of the seat portion 230.

At least two points on the seat portion 230 according to the second embodiment of the present disclosure are spaced apart from each other by different distances from a central axis (C; hereinafter referred to as "central axis") vertically penetrating the central hole 210. Here, the fact that at least two points on the seat portion 230 are spaced apart from the central axis C by different distances means that the seat portion 230 does not protrude along a circular path.

Since the pressing region is not circular, each part of the annular disc 20 is opened with a time difference. Here, that a certain part of the disc 20 is opened means that the part is separated from the retainer 200 for a shock absorber. For example, referring to FIG. 6, the hydraulic pressure acts first on a region A' of the disc 20 placed radially inside the seat portion 230, and the hydraulic pressure acts later on a region B' of the disc placed radially outside the seat portion 230.

In addition, the seat portion 230 according to the second embodiment of the present disclosure forms a rotationally asymmetrical shape with respect to the central axis C. That is, the seat portion 230 does not overlap when rotated at a certain angle based on the central axis C.

Since the pressing region defined by the seat portion 230 having this shape is not rotationally symmetrical, the disc 20 receiving the hydraulic pressure can be tilted and displaced upward. For example, when the fluid flows into the retainer 200 for a shock absorber from the compression channel, the region A' in FIG. 6 is lifted earlier than the region B'. In this process, an inflow amount of the fluid continuously changes compared to when the disc 20 is displaced upward without tilting, so that vibration of the vehicle is more effectively damped.

In addition, the seat portion 230 according to the second embodiment of the present disclosure forms the outer periphery of the retainer 200 for a shock absorber. That is, the outer periphery of the retainer 200 for a shock absorber is defined by the seat portion 230. As a result, there is no need to allocate unnecessary materials to the outside of the seat portion 230, and thus, the manufacturing cost of the retainer 200 for a shock absorber can be reduced.

The seat portion 230 may include first diameter portions 231*a* and 231*b* having at least one circular arc protruding from a position spaced apart from the central axis C by a first radius R1, and a second diameter portion 232 having at least one circular arc protruding from a position spaced apart from the central axis C by a second radius R2. Furthermore, the seat portion 230 may further include a connecting portion 233 that connects the first diameter portions 231*a* and 231*b* and the second diameter portion 232 to each other to form a closed curve and has a smooth shape in all sections. Here, having a smooth shape in all sections means having a shape without angular corners in all sections. Due to this shape, the fluid can flow more smoothly without forming a vortex.

Specifically, the first diameter portions 231*a* and 231*b* has two circular arcs 231*a* and 232*b* spaced 60 degrees apart from the central axis C, the second diameter portion 232 has two circular arcs 232 protruding in a space between the two circular arcs, and between the circular arcs, the connecting portion 233 that smoothly connects the first diameter portions 231*a* and 231*b* and the second diameter portion 232 may protrude. The two circular arcs 232 of the second diameter portion 232 may have the same length and may be spaced apart from each other by 120 degrees with respect to the central axis C. One 231*b* of the circular arcs of the first diameter portion may have a longer length than the other 231a.

The through hole 250 may be formed at a location away from the central axis C by a third radius larger than the first radius R1 and smaller than the second radius R2. That is, the through hole 250 is formed between the first diameter portion 231*a* and 231*b* and the second diameter portion 232 in the radial direction. Two through holes 250 may be formed inside each radius of the circular arc of the second diameter portion 232.

In addition, the retainer 200 for a shock absorber may further include a partition wall 260 which protrudes radially inward from the second diameter portion 232 and in which at least a portion disposed between the two through holes 250. The partition wall 260 may protrude from the second diameter portion 232 to a position spaced apart from the rotation axis by the first radius R1.

The area of each through hole 250 may be greater than or equal to a predetermined size. Here, the area of the through hole 250 may be determined in consideration of the difficulty of the manufacturing process of the retainer 200 for a shock absorber, for example, the casting process. The retainer 200 for a shock absorber of the present disclosure can be produced, for example, only through a casting process, but when the through hole 250 is too small, since a process of drilling the through hole 250 should be additionally performed after the casting process, the area of the through hole 250 is determined in consideration of the difficulty of the manufacturing process.

The above description is merely an example of the technical idea of the present disclosure, and those skilled in the art can make various modifications, changes, and substitutions without departing from the essential characteristics of the present disclosure. Therefore, the embodiments are not intended to limit the technical idea of the present disclosure, but to explain, and the scope of the technical idea of the present disclosure is not limited by these embodiments. The protection scope of the present disclosure should be construed according to the claims below, and all technical ideas within the equivalent range should be construed as being included in the scope of the present disclosure.

[Detailed Description of Main Elements]

| | |
|---|---|
| 100, 200: retainer for a shock absorber | 110, 210: central hole |
| 120, 220: protrusion portion | 130, 230: seat portion |
| 131, 231: first diameter portion | 132, 232: second diameter portion |
| 150, 250: through hole | 160, 260: partition wall |

What is claimed is:

1. A retainer for a shock absorber comprising:

a central hole formed in a central portion;

a protrusion portion protruding in a longitudinal direction along an outer periphery of the central hole;

at least one through hole formed outside a radius of the protrusion portion; and a seat portion protruding in the longitudinal direction outside a radius of the through hole to seat a disc, wherein at least two points on the seat portion are spaced apart from each other by different distances from a central axis vertically penetrating the central hole, the seat portion forms a rotationally symmetrical shape with respect to the central axis, and the seat portion forms an outer periphery of the retainer, wherein all areas of the seat portion are placed inside the radius of the outer edge of the disc, wherein the seat portion includes a first diameter portion having at least one circular arc protruding at a position spaced apart by a first radius from the central axis, and a second diameter portion having at least one circular arc protruding at a position spaced apart by a second radius from the central axis, wherein each through bole is formed at a position away from the central axis by a third radius, and the third radius is larger than the first radius and smaller than the second radius, wherein two through boles are formed inside each radius of the circular arc of the second diameter portion, and the retainer for a shock absorber further includes a partition wall which protrudes radially inward from the second diameter portion and in which at least a portion is disposed between the two through boles.

2. The retainer for a shock absorber of claim 1, wherein the seat portion further includes a connecting portion that connects the first diameter portion and the second diameter portion to form a closed curve and has a shape without any angular corners in all sections.

3. The retainer for a shock absorber of claim 1, wherein a plurality of through holes are formed, and the plurality of through holes are equiangularly arranged.

4. The retainer for a shock absorber of claim 1, wherein an area of each through hole is equal to or larger than a predetermined size.

5. The retainer for a shock absorber of claim 1, wherein the protrusion portion and the seat portion protrude by the same height in the longitudinal direction.

6. A retainer for a shock absorber comprising:

a central hole formed in a central portion;

a protrusion portion protruding in a longitudinal direction along an outer periphery of the central hole;

at least one through hole formed outside a radius of the protrusion portion; and a seat portion protruding in the longitudinal direction outside a radius of the through hole to seat a disc, wherein at least two points on the seat portion are spaced apart from each other by different distances from a central axis vertically penetrating the central hole, the seat portion forms a rotationally asymmetrical shape with respect to the central axis, and the seat portion forms an outer periphery of the retainer, wherein the seat portion includes a first diameter portion having at least one circular arc protruding at a position spaced apart by a first radius from the central axis, and a second diameter portion having at least one circular arc protruding at a position spaced apart by a second radius from the central axis, wherein each through bole is formed at a position away from the central axis by a third radius, and the third radius is larger than the first radius and smaller than the second radius, wherein two through holes are formed inside each radius of the circular are of the second diameter portion, and the retainer for a shock absorber further includes a partition wall which protrudes radially inward from the second diameter portion and in which at least a portion is disposed between the two through boles.

7. The retainer for a shock absorber of claim 6, wherein the seat portion further includes a connecting portion that connects the first diameter portion and the second diameter portion to form a closed curve and has a shape without any angular corners in all sections.

8. The retainer for a shock absorber of claim 6, wherein an area of each through hole is equal to or larger than a predetermined size.

9. The retainer for a shock absorber of claim 6, wherein the protrusion portion and the seat portion protrude by the same height in the longitudinal direction.

* * * * *